United States Patent [19]

Levin

[11] Patent Number: 4,522,253

[45] Date of Patent: Jun. 11, 1985

[54] WATER-SOURCE HEAT PUMP SYSTEM

[75] Inventor: Bennett Levin, Narberth, Pa.

[73] Assignee: The Bennett Levin Associates, Inc., Philadelphia, Pa. ; Retirement Plan Trust

[21] Appl. No.: 521,928

[22] Filed: Aug. 10, 1983

[51] Int. Cl.³ .............................................. F24F 3/14
[52] U.S. Cl. ...................................... 165/18; 165/22; 165/61; 237/2 B; 62/324.1; 62/238.6
[58] Field of Search ........................ 237/2 B; 126/400; 62/260, 238.3, 238.6, 324.1; 165/16, 22, 18, 61

[56] References Cited

U.S. PATENT DOCUMENTS 3,965,694 6/1976 Vignal et al. ......................... 62/260
4,122,893 10/1978 Thompson .......................... 237/2 B
4,237,963 12/1980 Girard ................................. 126/400

FOREIGN PATENT DOCUMENTS 146444 11/1979 Japan .

Primary Examiner—Henry Bennett
Attorney, Agent, or Firm—Steele, Gould & Fried

[57] ABSTRACT

A heating and cooling system for a building having a number of separately-controlled zone heat pumps includes a circulation conduit for heating or cooling a heat transfer fluid circulated throughout the system, and individual heat pumps for each of the controllable zones. Prior to dissipation of excess system heat by use of the cooling means, an additional heat pump in heat transfer contact with the circulation loop extracts heat for storage in a separate reservoir, at a temperature higher than that of the circulating fluid. The stored heat may be returned to the circulation conduit, or otherwise recovered as necessary for heating potable water or the like.

10 Claims, 3 Drawing Figures

WATER-SOURCE HEAT PUMP SYSTEM

BACKGROUND OF THE INVENTION

1. Field of the Invention

This invention relates to heat pump systems in which a circulating fluid allows excess heat due to varying needs for heating and cooling in particular zones to be shared between the zones for greater efficiency. In particular, the invention relates to such a system having a storage reservoir for waste heat, the reservoir being maintained at temperatures substantially higher than the temperature of the circulating fluid.

2. Description of the Prior Art

Heating and/or air conditioning systems in which excess energy is shared among individually-controlled heat pumps for a number of heating zones are known in the art. Examples of such systems include those of U.S. Pat. Nos. 3,523,575-Olivieri, 3,407,620-Lodge, 3,404,728-Laube, and 3,165,148-Soule. The temperature control systems of these patents allow heat extracted from the air in one zone of the building, for example, on the side exposed to the sun, to be routed via a circulating heat transfer fluid to other zones which require additional heat, for example, on the shady side of a building. Heating and cooling efficiency is substantially increased because the individual heat pumps are not adapted to directly dissipate waste heat. Instead, the individual units transfer waste heat into the heat circulating fluid. Only when the overall loop of circulating heat transfer fluid reaches a predetermined temperature is the heat dissipated, for example using a rooftop cooling tower.

Circulating-fluid building heating systems are useful for equalizing time imbalances in heating needs, as well as the foregoing spacial imbalances between needs of individually-controlled zones. Such imbalances may be a result of weather conditions, or the result of the imbalances in heating requirements produced by variations in use of lighting and other incidental heat generating facilities. Waste heat produced by people and by use of equipment can be accumulated in the circulating heat transfer system, to be extracted when needed, for example at night when the building is largely unoccupied and the various heat generating devices not operating.

The aforesaid patent to Olivieri teaches increasing the heat storage capability of such a water-source heat pump system by including a tank for storing an excess quantity of the heat transfer fluid. The excess fluid in the system constitutes a heat sink capable of smoothing at least a portion of the imbalances in heating requirements, providing a more efficient system. The capability of smoothing imbalances will be related to the extent of imbalance, and the mass of the thermal sink.

As heat is extracted from zones in the building by the circulating heat transfer fluid, which constitutes the thermal sink, the temperature of the fluid continuously rises. Inasmuch as the efficiency of individual zone heat pumps is directly related to the difference in temperature between the evaporator and condenser, overall efficiency will suffer if the temperature of the heat sink, that is, the mass of heat transfer fluid in the heat transfer loop, is allowed to become too high. The system designer of the water-source heat pump system including a quantity of excess fluid as a heat storage reservoir, is inclined to employ as large a reservoir as can be managed. The need for a large mass concerns both a need for large heat storage capacity to smooth large imbalances, and a need to keep the temperature of the heat transfer fluid as low as possible during times of maximum heat storage.

It is theoretically possible to employ a heat energy reservoir of sufficient size to completely smooth over all time and space imbalances in heating requirements. Such a system would go so far as to accumulate waste heat during the summer months for dissipation during the winter months. In view of the storage requirements and the decrease in efficiency at high heat transfer fluid temperatures, a reservoir of sufficient size would be impractical. Therefore, the efficiency of prior art systems, or their ability to accumulate a large quantity of excess heat for later extraction, has been limited.

According to the present invention, the basic system of a water source heat pump with a heat storage reservoir is made substantially more efficient by at least partly separating the thermal reservoir from the circulating heat transfer fluid, and allowing the reservoir to reach a much higher temperature. The circulating heat transfer fluid and the reservoir are joined by a connecting heat pump disposed between the circulating fluid and the reservoir fluid. The connecting heat pump extracts heat from the circulating fluid for deposit in the reservoir, stepping up the temperature of the reservoir over the temperature of the circulating fluid. Accordingly, at such higher temperatures, a substantially greater quantity of heat can be efficiently stored in a thermal sink of a given size. Means are provided for extracting the heat from the sink for useful purposes, including controllably bleeding the high-temperature reservoir fluid back into the circulating fluid system, and/or connecting separate heating loads such as potable water heaters by means of heat exchange devices.

The system of the invention is quite efficient in that minimum use is made of the system's rooftop cooling tower for cooling and boiler for heating, otherwise required to provide sufficient energy, or to extract sufficient energy, for operation of the individual zone heat pumps. The use of the higher-temperature heat storage reservoir connected via a heat pump provides dual benefits of higher storage capacity as well as increased efficiency of the individual heat pumps resulting from lower temperature heat transfer fluid.

SUMMARY OF THE INVENTION

It is an object of the invention to provide an improved water-source heat pump system capable of high efficiency over time, notwithstanding a thermal reservoir of minimum size.

It is also an object of the invention to accumulate the greatest possible proportion of building waste heat, for extraction when needed, to preclude unnecessary addition of heat to a building system.

It is another object of the invention to improve the operation of a water-source heat pump system having capacity for thermal storage by using normal circulating heat transfer fluid as the thermal storage medium, but maintaining a separate portion of the normal heat transfer fluid at substantially higher temperatures than the balance of the heat transfer fluid in the system.

It is yet another object of the invention to improve the overall efficiency of water-source heat pump systems at minimum cost and with minimum requirements of further equipment and space.

These and other objects are accomplished by a heating and cooling system for a building having a number of separately-controlled zone heat pumps including a circulation conduit for heating or cooling a heat transfer fluid circulated throughout the system, and individual heat pumps for each of the controllable zones. Prior to dissipation of excess system heat by use of the cooling means, an additional heat pump in heat transfer contact with the circulation loop extracts heat for storage in a separate reservoir, at a temperature higher than that of the circulating fluid. The stored heat may be returned to the circulation conduit, or otherwise recovered as necessary for heating potable water or the like.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
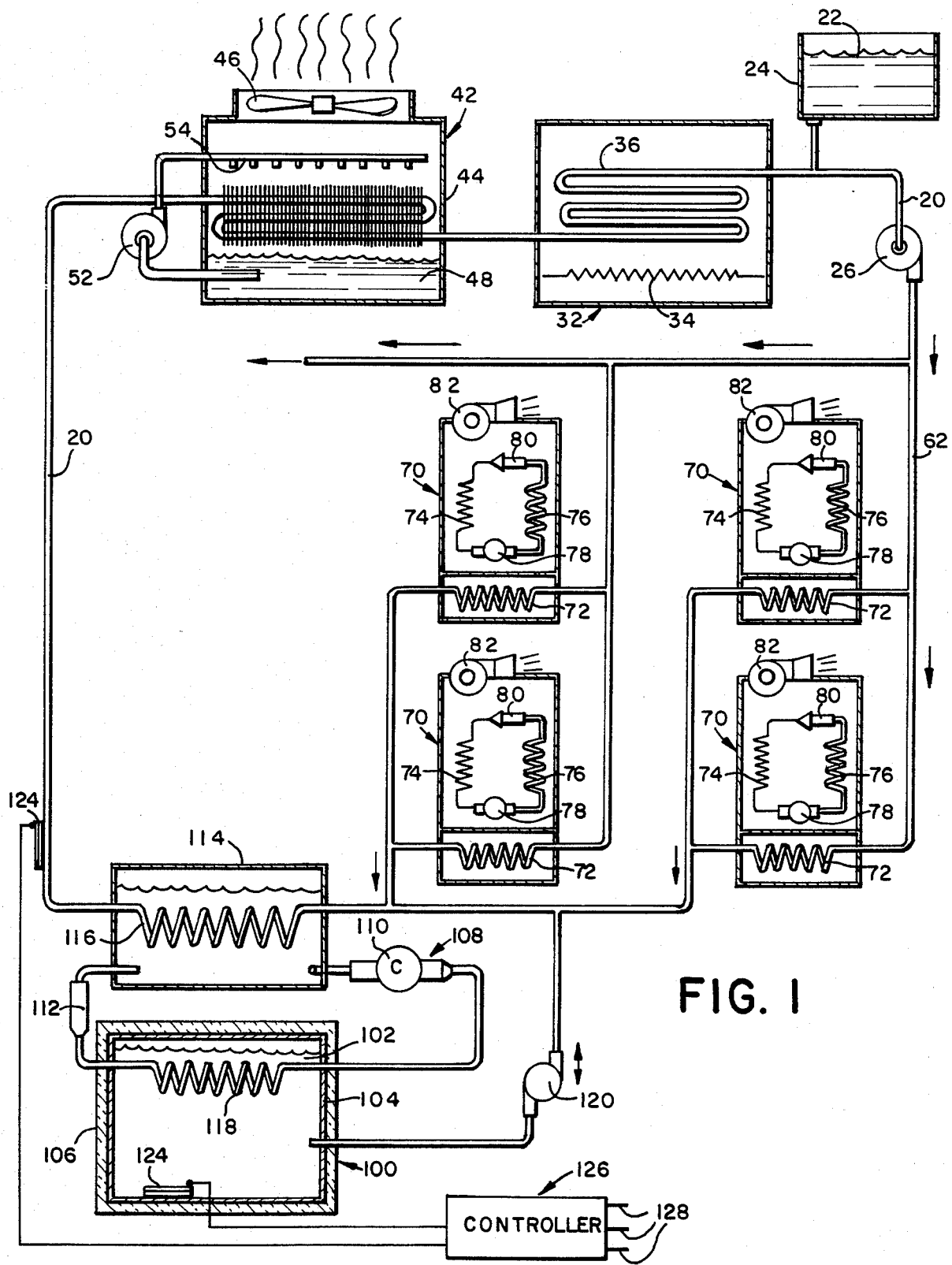
FIG. 1 is a schematic view of the water-source heat pump according to the invention, showing four of the individual temperature controlled zones.

The basic system of the invention is illustrated in FIG. 1. A circulation conduit 20 carries a heat transfer fluid around a circulation loop including individual zone heat pumps 70, a cooling device 42, and a heating device 32. The circulation loop also includes a connecting heat pump 108, adapted to extract excess heat from the circulation loop for deposit in a reservoir 100.

Pump 26 circulates the heat transfer fluid throughout the system, running continuously. Individual zone heat pumps 70 are each in thermal contact with the heat transfer fluid, by means of zone heat exchangers 72. In this manner, under control of the individual heat pump unit 70, heat may be extracted from the heat transfer fluid to be released in the temperature controlled zone, or waste heat extracted from the zone may be added to the heat transfer fluid.

Individual heat pump units 70 are shown in FIG. 1 in schematic. In general, each heat pump is adapted to condense and evaporate a heat transfer fluid (eg, freon) in a closed loop. Compressor 78 condenses the fluid, which passes through a heat exchanging condenser coil 74. The fluid is evaporated at expansion valve 80, and returns to compressor 78 through heat exchanging evaporator coil 76. Fan 82 expels warmed or cooled air to the space to be heated. In operating as an air cooler or as an air heater, individual heat pumps 72 selectively place either the evaporator coil or the condenser coil in heat exchange contact with fan 82 or zone heat exchange coil 72. For example, in heating, evaporator coil 76 is warmed from zone coil 72, thereby causing a corresponding increase in temperature at condenser coil 74. Fan 82 then draws air over condenser coil 74, expelling heated air into the zone. For cooling, condenser 74 is cooled by heat exchange through coil 72, air being blown over evaporator coil 76 for cooling. Valves and/or vents sufficient to direct the foregoing heat exchange relationships are individually controlled by heat pumps 70, for example, based upon set point control thermostats.

The temperature change of the heat transfer fluid due to passage of the heat transfer fluid through the individual zone heat pumps 70 will depend upon the overall system heating/cooling requirements at a given time. During the summer, when waste heat is added to the heat transfer fluid, the temperature of circulating fluid at incoming lines 62 will be somewhat lower than the temperature at return lines 64. During moderate temperature seasons, external building areas may require heating while internal building areas require a comparable amount of cooling. In such an event, the temperature at supply lines 62 and return lines 64 may be equal. If more zones require heating than cooling, the temperature at return line 64 will be lower than at supply line 62. In any event, imbalances in load between individual zones are cancelled, and any net is accumulated in the heat transfer fluid.

In typical water-source heat pump systems, waste heat is accumulated in the thermal mass of heat transfer fluid passing through conduit 20, slowly raising its temperature, the mass being possibly supplemented by an expansion tank 24 for excess fluid 22. At a predetermined temperature based upon temperature dependent efficiency of individual heat pump 70, the temperature of circulating coolant fluid must be reduced. Reduction of coolant temperature is accomplished by activating cooling tower 42. As known in the art, cooling tower 42 includes a heat transfer coil 44, through which coolant fluid is passed. Fan 46 operates to force air over heat exchanger 44, and pump 52 may be activated to spray water 48 over coil 44, through nozzle 54, to further chill the heat transfer fluid due to evaporation of sprayed water. Although cooler 42 is adapted to dissipate and dispose of energy in the form of waste heat, disposing of the energy requires exertion of further energy in the form of electric power for fan 46 and pump 52.

During cold weather, once available heat is extracted from the system and released in the individual zones, heat is added to the circulating fluid, using boiler 32. Boiler heat exchanger 36 is exposed to heating coil 34, increasing the temperature of the system heat transfer fluid. Zone heat pumps 70 then extract heat as needed.

It will be appreciated that cooling tower 42 and boiler 32 are shown only as examples of cooling and heating apparatus, respectively. The device of the invention will also operate well with other forms of coolers and heaters such as other types of heat exchangers, solar collectors, geothermal heat sources and the like. Even with a relatively inexpensive heat source or chiller, maximum efficiency requires that neither the chiller 42 nor heater 32 be operated any more than absolutely necessary. Chiller 42 and heater 32 cancel one another in the long run. These devices not only generate and then dissipate expensive energy, but also requires the expenditure of further energy in order to accomplish their mutual cancellation. Further energy is required to power heater 32 and to run pump 52 and fan 46, and each of the units requires space and maintenance. In order to avoid such wasteful cancellation, excess heat must be stored.

To prevent the necessity of using an impractically large reservoir 24 of excess fluid 22, and yet provide storage capacity at a relatively low coolant temperature, the device of the invention uses a separate reservoir, connected to the heat transfer fluid by means of a connecting heat pump 108. The reservoir may be maintained at temperatures which would be too high for efficient heat transfer at zone heat pump 70. Nevertheless, a smaller reservoir at higher temperature can store heat energy equal to that of a larger reservoir at low temperature. Therefore, the separate reservoir may be relatively small, while maintaining sufficient storage capacity.

Connecting heat pump 108 operates in a manner analogous to that of zone heat pumps 70. A compressor 110 condenses a heat transfer fluid which then passes through condenser coil 118, through expansion valve 112 and evaporator 114. Evaporator 114 extracts heat from the heat transfer system of the larger system, namely via heat exchanger 116. Due to the extraction of heat from the system fluid, the temperature at condenser coil 118 is correspondingly raised, the net result being transfer of heat from the circulating heat transfer fluid to reservoir 100 by means of the closed loop flow of heat transfer fluid in connecting heat pump 108. Reservoir 100 may contain the same type of fluid 102 as that circulated in conduit 20, for example, water. Reservoir 100 may be formed from a boiler-type tank 104, enclosed in insulation 106.

Controller 126 sequences the overall operation of the system. So long as waste heat is available in conduit 20, efficiency requires that connecting heat pump 108 be operated to extract the heat from the circulating fluid for deposit in the reservoir 100. Although the objective is to employ a sufficiently large reservoir 100 to store all the waste heat available, if reservoir 100 is too small, or in unusually warm circumstances, controller 126, comparing the outputs of thermostats 124 sensing the coolant and reservoir temperatures, controls activation of cooler 42. Controller 126, via outputs 128, would similarly control heater 32 for operation only when all available stored heat had been extracted from reservoir 100. In the embodiments shown in FIG. 1, reservoir 100 is connected to conduit 20 by means of bi-directional pump 120, which is operable to pump hot water from reservoir 100 back into the circulating system, and to replace extracted water from conduit 20. Various alternative schemes of connection between reservoir 100 and conduit 20 are possible, the objective being to allow extraction of reservoir heat when needed. It is presently preferred that such heat extraction be accomplished by bleeding reservoir fluid back into conduit 20, based upon reservoir and coolant temperatures sensed.

Figure 2:
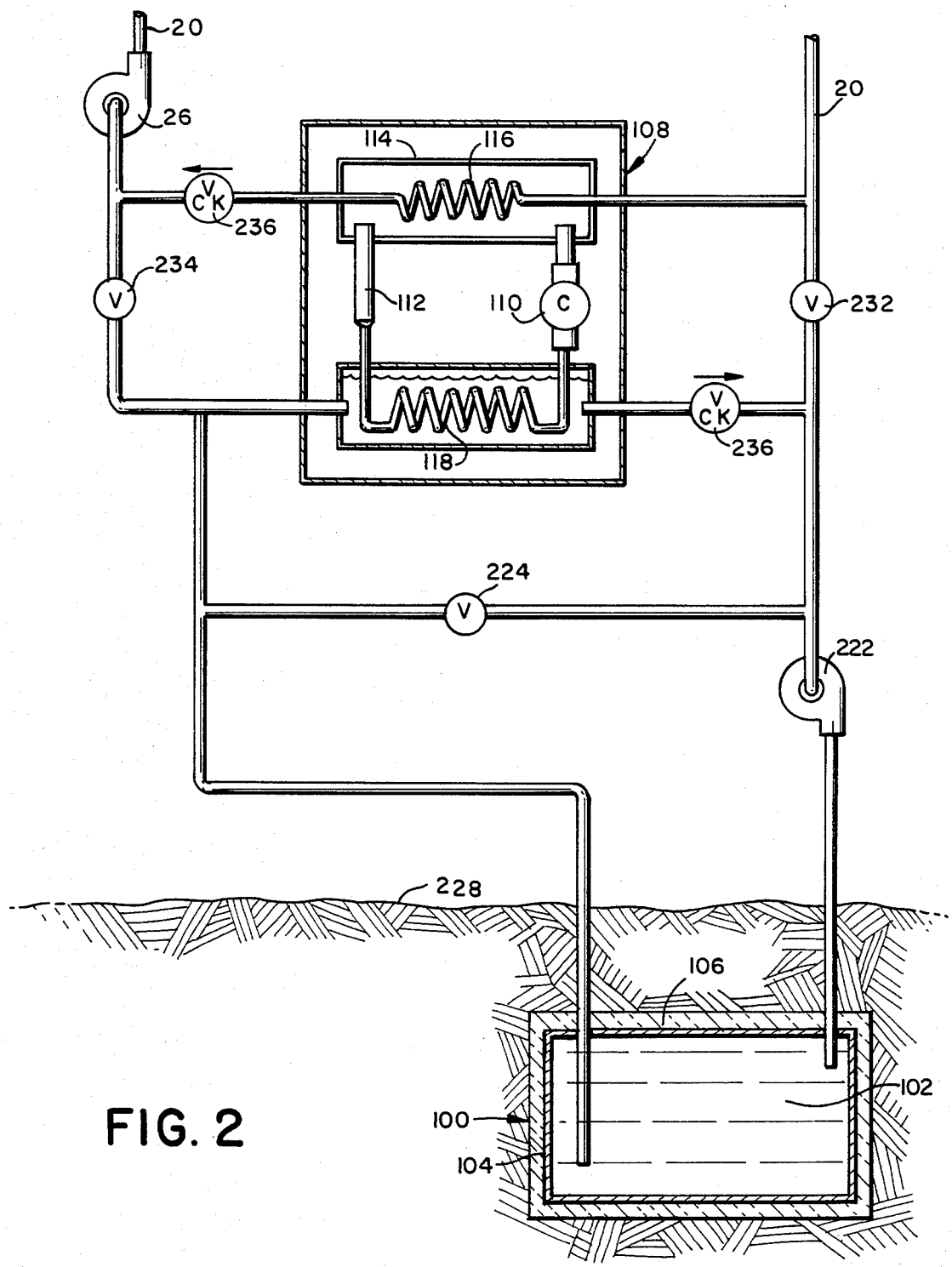
FIG. 2 is a partial schematic of an alternative embodiment, showing an alternative design of the connecting heat pump and reservoir.

In order to allow as large a reservoir 100 as practical, it is presently preferred that reservoir 100 be built at a location remote from other parts of the system, for example below ground level 228. As shown in FIG. 2, a circulating coolant loop associated with the reservoir carries reservoir fluid to condenser coil 118 of connection heat pump 108. In this embodiment, heated reservoir fluid is controllably bled back into circulating fluid conduit 20 by means of valve 234, and reservoir fluid is replaced from conduit 20 by means of valve 232. Both valves 232, 234 may be controllable proportionately or as momentarily-opened gate valves, and may be placed under control of controller 126. Check valves 236 prevent backflow of bled reservoir fluid or filling conduit fluid.

In addition to automatic control of bleeding and filling, controllable means 224, for example, a solenoid valve, can be provided to bypass the operation of connection heat pump 108. For example when the reservoir reaches a maximum temperature, reservoir fluid circulated between reservoir 100 (below ground level 228), by means of pump 222, is not routed through condenser coil 118. In other respects, operation of the embodiment of FIG. 2, like the embodiment of FIG. 1, controllably extracts heat from circulating fluid in conduit 20, and controllably returns the stored heat to the circulating fluid when needed.

Figure 3:
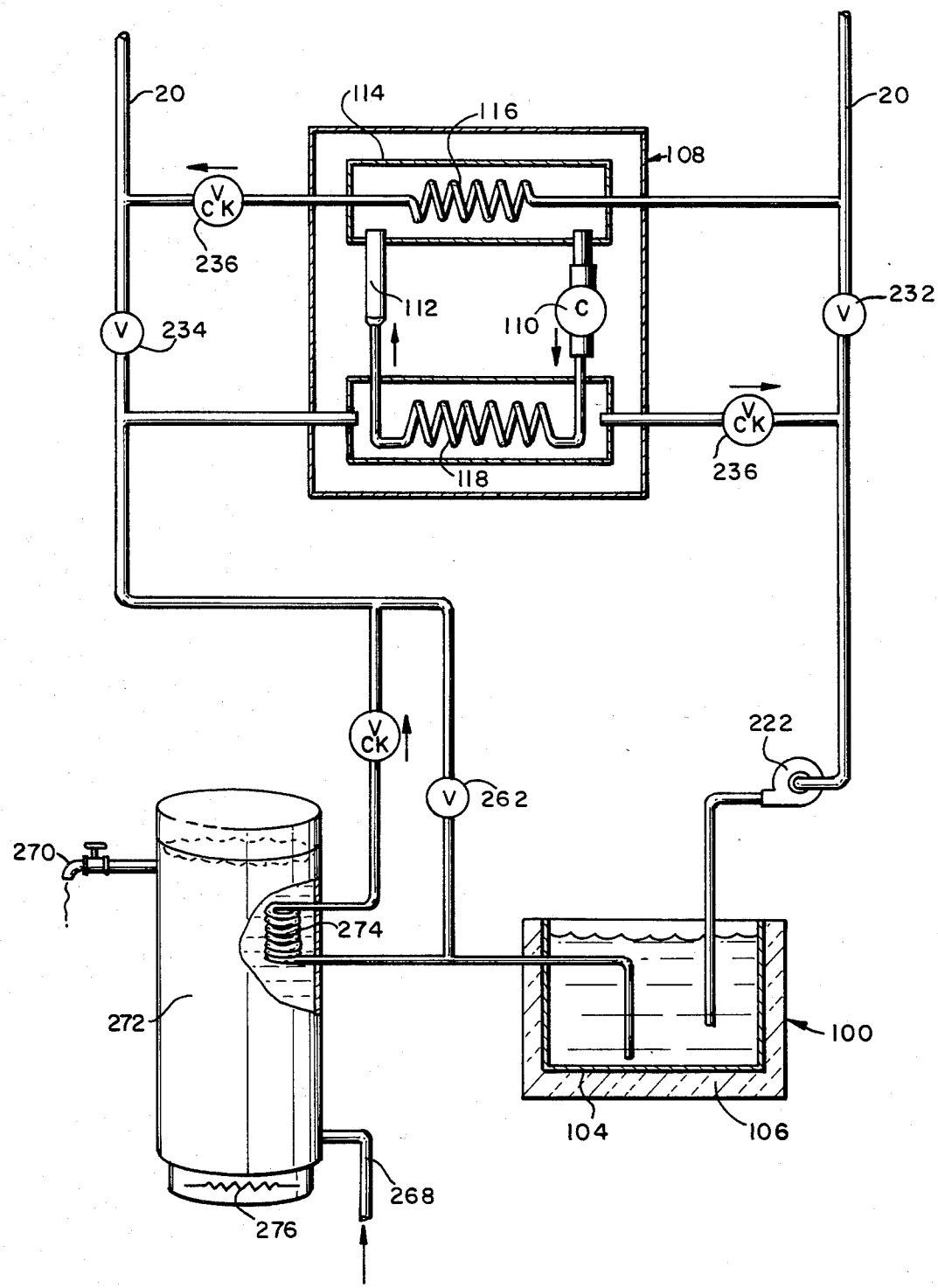
FIG. 3 is a partial schematic illustrating another alternative embodiment of the invention, and is particular of the connecting heat pump and reservoir.

The embodiments of FIGS. 1 and 2 are both based upon use of a reservoir fluid 102 of the same type as that circulated in conduit 20, for example, water or a mixture of water and an antifreeze solution. It will be appreciated that suitable heat transfer mechanisms within the spirit of the invention are possible using heat exchangers for connections, rather than fluid valves, whereby reservoir 100 need not contain the same fluid as the conduit 20. Moreover, in such case, reservoir 100 could comprise a non-liquid thermal sink or a heat transfer fluid having a higher boiling point than water, to preclude the necessity of using a pressure vessel for reservoir 100. As shown in FIG. 3, heat exchange contact between the reservoir loop and a heating load may be employed together in the same system with the reservoir 100 of a type holding the same heat transfer fluid as circulating conduits 20, but at a higher temperature.

With reference to FIG. 3, heat is extracted from circulating fluid in conduits 20 by connection heat exchanger 108, and in particular heat is extracted in evaporator 114 by means of circulating fluid passing through evaporator coil 116. Controllable valve 234 allows heated reservoir fluid to bleed back into conduit 20; fluid removed from the reservoir is replaced by means of controllable fill valve 232. Check valves 236 prevent backflow. Pump 222 circulates reservoir fluid between condenser coil 118 and a remote reservoir. This operation, which mixes the fluid in reservoir 100 and the fluid in conduit 20, is substantially the same as that described hereinabove with reference to FIG. 2. In addition, as shown in FIG. 3, a heat exchanger 274 can be placed in the circulating reservoir fluid loop to usefully extract heat from the reservoir fluid. FIG. 3 shows use of such heat to raise the temperature of potable water 272, supplied under pressure at supply line 268, and extracted upon demand at outlet 270. A supplemental heating source 276 is included for times in which the reservoir fluid is of insufficient temperature. To prevent extraction of heat from the potable water when reservoir 100 is not supplying heat, controllable valve 262 is open to bypass heat exchanger 274 with the circulating reservoir fluid.

Controller 126 (shown in FIG. 1) operates the various controllable valves and pumps, and initiates operation of the system heater 32 and cooler 42. These components may be controllable only in "on" and "off" modes, or may be proportionally controllable or operable in stages. It is presently preferred that a series of temperature sensors 124 having different set points be included such that the controller initiates operation of the control devices in stages based upon the particular set point passed. With reference to cooler 42, the lowest temperature set point may cause activation of fan 46, a higher set point causing activation of spray pump 52. Various control schemes will now become apparent, the structure and function of the device of the invention having been disclosed. The invention is believed to be likewise applicable to the simplest of set point controls, and to the most sophisticated proportional feedback controls and computerized load management devices. Reference should be made to the appended claims rather than the foregoing specification as defining the true scope of the subject invention.

What is claimed is:

1. A heat pump system for efficiently heating and cooling a plurality of zones, comprising:
   a circulation conduit for circulating a heat transfer fluid in a loop including a controllable fluid heater, a controllable fluid cooler and a pump for forcing the fluid around the loop, the fluid having a first temperature;
   a plurality of zone heat pumps, each disposed between an individual zone of the plurality of zones and the circulation conduit, each of the zone heat pumps having means for controllably transferring heat in both directions between the fluid and the individual zone;
   a heat storage loop including a connecting heat pump having an evaporator in heat transfer contact with the fluid in the circulation conduit and a condenser in heat transfer contact with a heat storage fluid in contact with a thermal reservoir, the connecting heat pump being operative to transfer heat from the heat transfer fluid in the circulation conduit to the heat storage fluid in contact with the reservoir, said heat storage fluid having a second temperature, higher than said first temperature, whereby excess heat is concentrated and stored in a small volume; and,
   means for extracting heat from the reservoir and adding extracted heat to the heat transfer fluid in the circulation conduit.

2. The system of claim 1, wherein the reservoir contains a quantity of the heat storage fluid, the system further comprising a pump and conduit for circulating the heat storage fluid of the reservoir between the reservoir and the condenser of the connecting heat pump.

3. The system of claim 2, further comprising:
   a controller coordinating operation of the fluid heater, fluid cooler and the heat storage loop; and,
   temperature sensor connected to the controller and operable to detect the temperature of the reservoir, the controller preferentially causing storage of heat in the reservoir until a predetermined high temperature is reached in the reservoir, whereupon the controller causes dissipation of heat from the circulating heat transfer fluid through the fluid cooler.

4. The system of claim 3, further comprising:
   a temperature sensor connected to the controller and operable to detect the temperature of the circulating fluid; and,
   the controller also coordinating operation of the means for extracting and adding heat, the controller preferentially causing extraction of heat from the reservoir until a predetermined low temperature is reached in the circulating fluid, whereupon the controller causes addition of heat to the circulating fluid through the fluid heater.

5. The system of claim 4, wherein said means for extracting heat comprises a controllable valve for bleeding reservoir heat storage fluid into the circulation conduit, the system further comprising means for replacing reservoir heat storage fluid.

6. The system of claim 4, wherein said means for extracting heat comprises a heat exchanger for transfer of heat between the reservoir and a potable water supply.

7. The system of claim 5, wherein said means for extracting heat further comprises a heat exchanger for transfer of heat between the reservoir and a potable water supply.

8. The system of claim 2, wherein said means for extracting heat from the reservoir comprises a controllable valve for bleeding reservoir heat storage fluid into the circulation conduit, the system further comprising means for replacing reservoir heat storage fluid.

9. The system of claim 1, wherein said means for extracting heat comprises the connecting heat pump, the connecting heat pump being operative to transfer heat in both directions between the circulation conduit and the reservoir.

10. The system of claim 1, wherein the reservoir is insulated to confine heat therein.

* * * * *